United States Patent
Compton et al.

(12)
(10) Patent No.: US 6,811,030 B1
(45) Date of Patent: Nov. 2, 2004

(54) METHOD FOR RECYCLING

(76) Inventors: Robert E. Compton, P.O. Box 132, Prattsville, NY (US) 12468; Linda M. Compton, P.O. Box 132, Prattsville, NY (US) 12468

(*) Notice: Subject to any disclaimer, the term of this patent is extended or adjusted under 35 U.S.C. 154(b) by 7 days.

(21) Appl. No.: 10/410,221

(22) Filed: Apr. 9, 2003

(51) Int. Cl.$^7$ ................................................ B07C 7/00
(52) U.S. Cl. .......................................... 209/2; 209/930
(58) Field of Search ........................... 209/930, 2, 702, 209/942; 700/90, 213, 214, 215, 219; 705/400

(56) References Cited

U.S. PATENT DOCUMENTS

| | | | |
|---|---|---|---|
| 4,579,216 A | | 4/1986 | DeWoolfson et al. |
| 4,949,528 A | * | 8/1990 | Palik ............................ 53/429 |
| 5,100,005 A | * | 3/1992 | Noble et al. ................. 209/583 |
| 5,226,519 A | | 7/1993 | DeWolfson |
| 5,555,497 A | | 9/1996 | Helbing |
| 5,628,412 A | * | 5/1997 | Hulls ........................... 209/702 |
| 5,724,518 A | | 3/1998 | Helbing |
| 6,131,371 A | * | 10/2000 | Esser et al. ................... 53/433 |

* cited by examiner

Primary Examiner—Donald P. Walsh
Assistant Examiner—Mark J. Beauchaine

(57) ABSTRACT

A method for removing recyclables with disposables. Each customer signs an authorization form and selects the manner in which that customer desires to have the deposits credited for that customer's recyclables. Selections include a charitable donation in the name of the customer and a cash payment and a credit to the customer's disposal service. The recyclables are removed with the customer's disposables and are taken to a recycling faculty where they are counted. A tag which the customer places on the bag of recyclables is completed and sent to the office to be credited to the customer's account. The recyclables are then place in separate bins for return to the supplier who in turn refunds the deposit to the recycling service along with a handling fee. The handling fee si taken by th recycling service and the deposits are refunded to the each customer asper each customer's instructions.

8 Claims, 4 Drawing Sheets

METHOD FOR RECYCLING

BACKGROUND OF THE INVENTION

1. Field of the Invention

This invention relates to a method for recycling and more particularly to a method for recycling in combination with the collection of disposables or non-recyclable material which provides to the customer a series of options as to the refund of the deposit including a credit toward the customer's disposal service, a cash payment and charitable contributions in the name of the customer to a recognized charity selected by the customer.

2. Prior Art

The need to recycle is a fact of life today. Numerous containers made from metal, glass and plastic are now subject to a deposit and are required to be recycled. In the future, many additional containers and other products that will have to be recycled. The amount of the cash deposit is most certain to increase further to assure that consumers will recycle and not loose the deposit to save time in recycling but at the expense of land fills. To encourage consumers to recycle, a method which is convenient to the customer or consumer and causes the least amount of interference in the daily life of the consumer is bound to encourage recycling.

Currently disposal services do remove recyclables with disposables. The recyclables are disposed of and the deposit money received is, at least in some circumstances, distributed to charity. The donation, however, is not of any benefit to the customers whose recyclables produced the deposit money.

Various patents have dealt with the processing of recyclables. These patents have not, however, proposed a method of collecting recyclables with the collection of disposables, which method provides the customer with a variety of options to benefit the customer with the deposit refund, including credit for the cost of disposal service, cash payments and payments to a designated recognized charity while providing the customer with a tax credit for the charitable payment.

The DeWoolfson, et al Patent, U.S. Pat. No. 4,579,216 teaches a group of remotely located machines which are connected to a central coordination facility. The customer in certain circumstances is awarded what is described as a valuable token. The retailer, where the machine is located, is paid a share. The distributors or suppliers are invoiced and the store where the machine is located is paid a share. This Patent does involve the opportunity for a consumer to select between a charity or a payment but does not even suggest a credit against the cost of disposal service or provide proof of a charitable deduction for subsequent tax purposes.

The DeWoolfson Patent U.S. Pat. No. 5,226,519 is similar to the DeWoolfson et al Patent just reviewed. However, this Patent includes bulk storage facilities for crushed product which is segregated in bulk storage facilities. Pneumatic means are used to feed the crushed product to the storage facility.

OBJECTS

The objects of this invention are as follows:

To provide an integrated method which provides the customer maximum flexibility is selecting the manner that the customer desires to be benefited by the recycling of recyclables.

To provide a method for recycling with the collection of disposables that permits a customer to apply the refundable deposit on recyclables toward the cost of the customer's disposal service.

To provide a method for recycling with the collection of disposables that permits a customer to obtain a cash payment at a selected time period such as a reasonable time period before the holiday season.

To provide a method for recycling with the collection of disposables that permits the customer to select a recognized charity and apply the deposit to the charity in the name of the customer with full credit for the charitable payment going to the customer.

To provide a method for recycling with the collection of disposables that both encourages the customer to recycle and which provides the customer with maximum flexibility for being benefited by recycling.

These and other objects will be apparent to those skilled in the art when read in conjunction with the annexed description and drawings.

SUMMARY OF THE INVENTION

A method is provided for use with the removal of disposables for recycling the products of various suppliers and of various types and then benefitting each customer for the deposit previously paid by that customer in a predetermined manner selected by that customer. Each customer selects the manner by which that customer desires to be benefited by the refund of deposits. The recyclables are placed by the customer in a separate container which container is tagged to identify the customer. Upon removal, the recyclables are separated by supplier and type and returned to the appropriate supplier. The deposits refunded are then allocated to each customer in accordance with their instructions.

DESCRIPTION OF THE NUMERALS

| NUMERAL | DESCRIPTION |
| --- | --- |
| 11 | Authorization Form |
| 13 | Customer Number |
| 15 | Bar Cod |
| 17 | Name and Address |
| 19 | Three Boxes |
| 21 | Tags |
| 23 | Recyclables |
| 25 | Disposables |
| 27 | Commercial Building |
| 29 | Platform |

-continued

| NUMERAL | DESCRIPTION |
|---|---|
| 31 | Containers |
| 33 | Chute |
| 35 | Sign |
| 37 | Conveyor |
| 39 | Table |

DETAILED DESCRIPTION OF THE PREFERRED EMBODIMENT

It is usual for disposal services which pick up disposable material from the homes and business of customers to also pick up recyclable material. In some jurisdictions, it is necessary to have separate entities for each purpose but if commonly owned, the two entities can operate cooperatively. Even if a disposal service does not engage in recycling, the product accepted by it can be turned over to a recycling service and the method can be used in the same manner.

Currently, recycling operations do not credit the customer. Machines in stores do refund deposit money and, in specific cases, can permit selection of a charitable contribution. This, however, requires the customer to bag the items, take them to a store and then, possibly after waiting for a redemption machine to become available, to feed the various items into the respective machine capable of handling that specific product. With the time demands on people in modern times, it is only too likely that the recyclable products will be disposed of as a disposable and the refund merely forgone as not being worth the effort. This places an even further burden on the ability of landfills to handle disposables.

Consumers who use a disposal service, if they wish to take the time to sort, have the recyclable picked up separately but the customer gains nothing but a sense of being a good citizen as the recycling service recovers the deposit and should give a part of it to charity. No disposal service is know to provide a service which benefits the customer by returning deposit recyclables separately from disposables. With separate bagging and labeling being the sole requirement for a monetary benefit, the customer is most likely to take advantage of the method and, as a result, much needed recycling is enhanced.

Figure 1:
FIG. 1 is a plan view of customer authorization sheet on which the customer who is identified by a customer number which can be read on a bar code as well as name and address and on which the customer identifies the manner by which the customer desires to receive or otherwise be compensated for the deposit value of recyclables picked-up.
Figure 2:
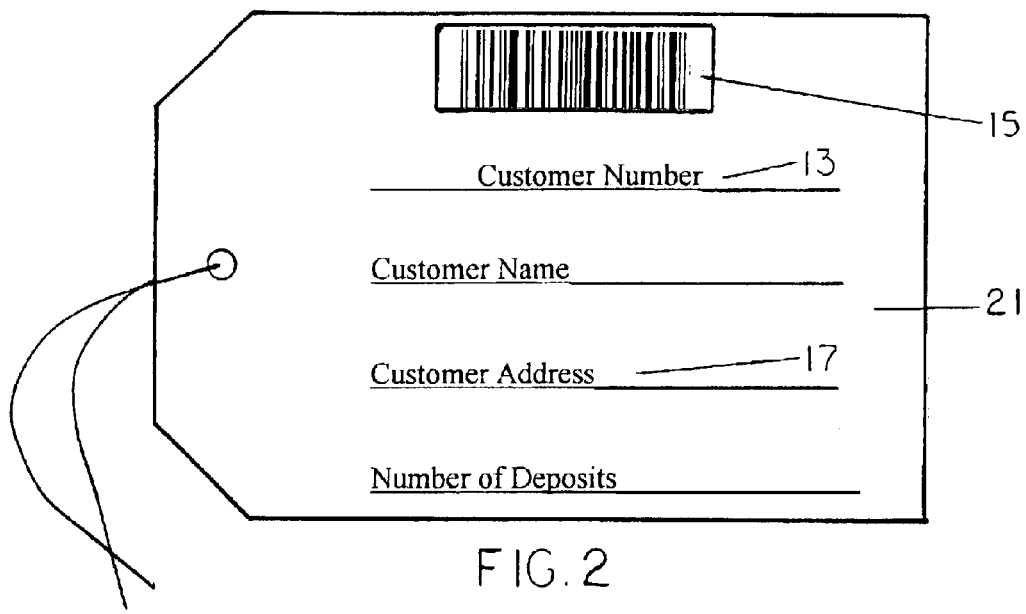
FIG. 2 is a customer tag which must be placed by the customer on each bag of recyclables.
Figure 3:
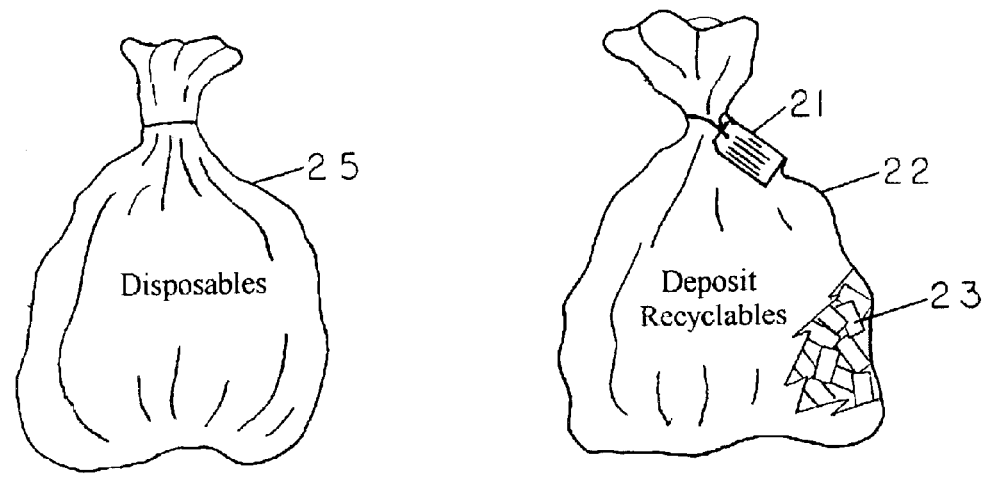
FIG. 3 is a pictorial view of a bag of disposable material and a bag of recyclables with the tag shown in FIG. 2 affixed to the bag of recyclable.
Figure 4:
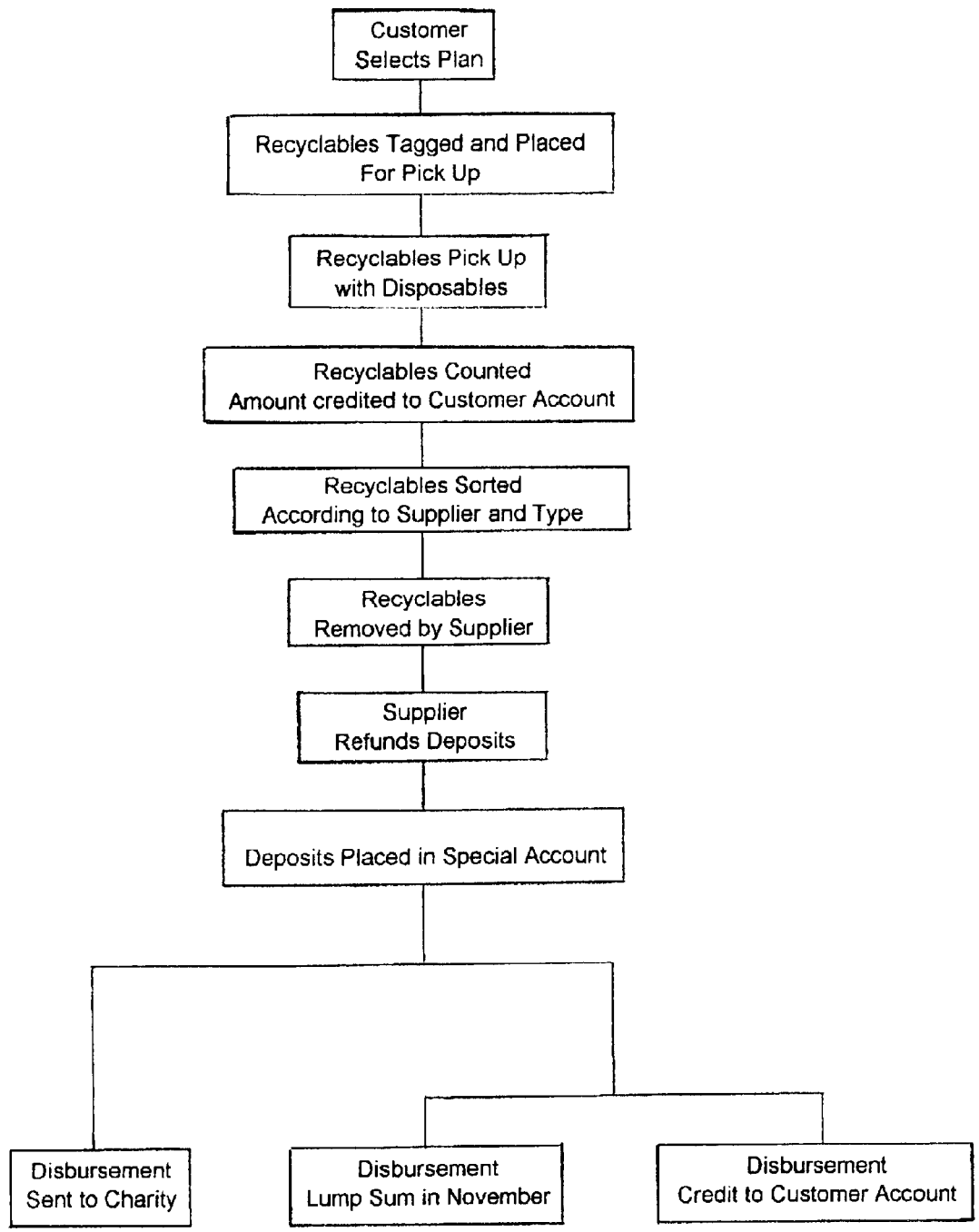
FIG. 4 is a flow chart showing the steps of the method.

In practicing the method the first step is to present to each disposal customer with an authorization form 11, as shown is FIG. 1. Each customer would be assigned a customer number 13 which would be placed on the authorization form 11. The customer 13 number optimally would also be reflected in a bar code 15 so that the information could be quickly scanned into a computer. The name and address 17 of the customer would preferably also be stated on the authorization form 11. A customer could change the authorization form 11 should a change in the manner of compensation be desired and all deposit recyclables collected after the change in the authorization form would be handled in accordance with the new authorization form 11. The customer or customers would be required to sign the authorization form 11 on a signature line.

The authorization form 11 (FIG. 1) will provide the customer with three boxes 19 by which the customer can elect to be compensated for the value of deposit recyclables. These three ways are as follows:

1. Apply the deposit as a credit against the cost of the disposal service. Should the value of the recyclables exceed the cost of the disposal service, a quarterly check will be issued for the difference.
2. A lump sum cash payment each year for all deposits due the customer. Preferably such cash payment would be made in November of each year to provide a cash sum for use in shopping at the holiday season.
3. A lump sum cash payment, also preferably in November, to any recognized charity selected by the customer. Payment is made in the name of the customer and proof of payment is provided so that the customer is the donor as if the customer had directly made the payment to the charity.

Once authorization form 11 is complete, the customer is issued tags 21 to place on the bag containing the recyclables 23. The tags 21 also have the customers name and address 17 as well and also preferably a bar code 10 for scanner purposes. On the tag 21, the customer may list the number of recyclables 23, however, since the recycling service will count the recyclables 23 each time, the customer need not fill in the number of recyclables 23 in the bag 22 which has the tag 24 affixed to it. This bag 22 is segregated from the disposables 25 picked up from the customer.

Figure 5:
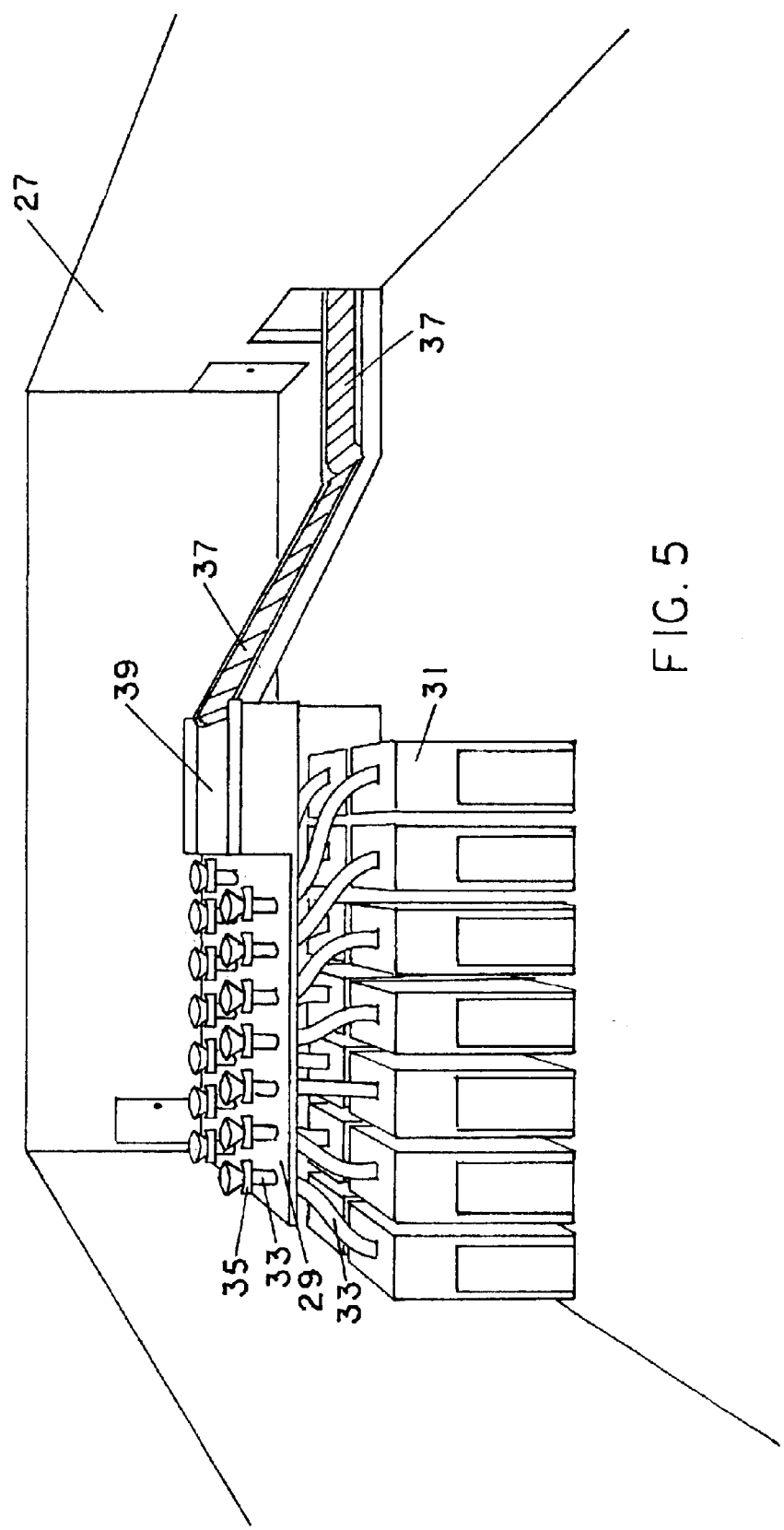
FIG. 5 is a pictorial view of the facility in which the deposit recyclables are sorted for return to the appropriate product manufacturer.

As shown is FIG. 5, the bag 22 is taken by the disposal service to a recycling facility were the bag 22 is opened and the count of the number of bagged recyclables is verified. The amount of credit is then immediately entered onto the customer's account. Then the credit balance of the customer is placed in a special account for the benefit of the customer in accordance with the authorization form 11.

Still referring to FIG. 5, the recycling facility is shown. The recycling facility requires a commercial building 27 with a reasonably high ceiling. A platform 29 is constructed in the commercial building 27 higher than the floor level of the building while still leaving sufficient head room for an operator to work on the platform 29.

Beneath the platform 29 are a plurality of containers 31. Each container 31 has a chute 33 connected to it which extends above the platform 29. A sign 35 is placed on each chute 33 which describes the supplier and type of a specific recyclables. In some case, multiple brands from the same supplier can be placed together and fed through the same chute 33. Obviously, the type of container, such as aluminum cans and plastic bottles must always be segregated.

A conveyor 37, which can be either loaded outside the recycling facility or inside the recycling facility carries the bag of recyclables 23 up to the platform 29. An operator places one bag 22 at a time on a table 39 situated on the platform 29, opens it, confirms the customer's count, if the customer has provided a count, or, if no count was provided by the customer, then to count the quantities and enter them on the tag 21. The tag 21, of course, must be removed from the bag 22. The operator after completing and confirming the statements on the tag 21 places the tag 21 in a separate pile for submission to the office. In the office, the information is transposed onto each customers account. Then as previously described, the proceeds once reviewed, are distributed in accordance with the customers authorization form.

Once the various recyclables 23 are sorted by supplier and type of recyclable 23, the recyclables 23 are placed in a container 31. The recyclables 23 are removed from the containers 31 and the specific quantity of recyclables 23 in each container 31 is verified. The various suppliers then each recover their own recyclables 23 and refund the deposit to the recycling services with a further handling fee. A supplier of products in recyclables is required by law to remove the recyclables 23 from a recycling serivee and to refund the deposits and a handling fee for the recyclables 23 The recycle after taking the handling fee, then places the deposits a special account for distribution as previously described.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. A method for use in conjunction with the removal of disposables for recycling the recyclables of various suppliers and various types from a group of customers and benefitting each customer for deposits previously paid by each respective customer on account of the recyclables, such method comprising:

having each customer designate the manner by which that customer is to be benefited by the refund of deposits for the recyclables;

having each customer place the recyclables of the customer in a separate bag with a tag affixed to the bag to identify the customer;

removing the recyclables;

counting the recyclables;

separating the recyclables by supplier and type of recyclable;

delivering the recyclables to the respective suppliers and obtaining a refund of the previously paid deposits for each recyclables; and allocating the deposit to each customer to benefit each customer in accordance with the manner designated by that customer.

2. A method according to claim 1 wherein the manner by which the customer is to be benefited is to have a credit against the cost of removal of disposables.

3. A method according to claim 1 wherein the manner by which the customer is to be benefited is a cash payment.

4. A method according to claim 1 wherein the manner by which the customer is to be benefited is a donation to charity in the name of the customer.

5. A method for use in conjunction with the removal of disposables for recycling the recyclables of various suppliers and various types from a group of customers and benefitting each customer for deposits previously paid by each respective customer on account of the recyclables, such method comprising:

having each customer issue an authorization form for the removal of recyclables which designates a predetermined manner by which that customer is to be benefited by the refund of deposits for recyclables;

assigning each customer a separate customer number;

issuing a plurality of tags to each customer, each tag including the customer number of the customer to which such tags are issued;

having each customer place the recyclables of that customer in a separate bag with one of the tags affixed thereto;

having each customer place each bag of recyclables with one of the tags affixed thereto with disposables;

removing the recyclables with the disposables, the recyclables being kept segregated from the disposables;

counting the recyclables;

separating the recyclables by supplier and type of recyclable;

having the supplier for each recyclable remove those respective recyclables and refund all deposits previously paid therefore; and allocating the deposit to each customer to benefit that customer in accordance with the authorization form issued by that customer.

6. A method according to claim 5 wherein the manner by which the customer is to be benefited is to have a credit against the cost of removal of disposables.

7. A method according to claim 5 wherein the manner by which the customer is to be benefited is a cash payment.

8. A method according to claim 5 wherein the manner by which the customer is to be benefited is a donation to charity in the name of the customer.

* * * * *